(12) United States Patent
Tan et al.

(10) Patent No.: US 11,914,466 B2
(45) Date of Patent: *Feb. 27, 2024

(54) SYSTEMS AND METHODS FOR PAUSE-CORRECT-REPLAY WORKFLOW CUSTOMIZATION

(71) Applicant: Nintex UK Ltd., London (GB)

(72) Inventors: Joshua Joo Hou Tan, Newport (AU); Alain Marie Patrice Gentilhomme, Sammamish, WA (US)

(73) Assignee: Nintex UK Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,359

(22) Filed: Aug. 30, 2022

(65) Prior Publication Data

US 2023/0244565 A1 Aug. 3, 2023

Related U.S. Application Data

(63) Continuation of application No. 16/834,995, filed on Mar. 30, 2020, now Pat. No. 11,455,205.

(60) Provisional application No. 62/826,541, filed on Mar. 29, 2019.

(51) Int. Cl.
| | |
|---|---|
| *G06F 11/07* | (2006.01) |
| *A61C 13/00* | (2006.01) |
| *A61C 13/34* | (2006.01) |
| *B33Y 50/02* | (2015.01) |
| *B33Y 80/00* | (2015.01) |

(52) U.S. Cl.
CPC ...... *G06F 11/0793* (2013.01); *A61C 13/0004* (2013.01); *A61C 13/0019* (2013.01); *A61C 13/34* (2013.01); *G06F 11/0745* (2013.01); *G06F 11/0751* (2013.01); *G06F 11/0772* (2013.01); *B33Y 50/02* (2014.12); *B33Y 80/00* (2014.12)

(58) Field of Classification Search
CPC ............. G06F 11/0793; G06F 11/0745; G06F 11/0751; G06F 11/0772
See application file for complete search history.

(56) References Cited

U.S. PATENT DOCUMENTS 11,455,205 B2 * 9/2022 Tan ..................... G06F 11/0772

* cited by examiner

*Primary Examiner* — Nadeem Iqbal
(74) *Attorney, Agent, or Firm* — Perkins Coie LLP

(57) ABSTRACT

This disclosure pertains to systems and methods that allow users to specifically detect and correct errors within workflows quickly, efficiently, and with minimal repercussions. Once the error is corrected, users have the option to continue the workflow from the point of failure or from a point prior to the point of failure, while also having the option to bypass completed actions and/or other actions in a workflow. The improved communication technology comprises functionality that pauses relevant workflows or processes as soon as the error is detected and while it is corrected. The disclosure also improves communication technology between the networks and servers of separate parties relevant and/or dependent on successful execution of other workflows or processes; allowing for effective understanding, implementation, and engagement of business processes across organizational boundaries.

20 Claims, 7 Drawing Sheets

SYSTEMS AND METHODS FOR PAUSE-CORRECT-REPLAY WORKFLOW CUSTOMIZATION

CROSS-REFERENCE TO RELATED APPLICATIONS

This application claims benefit to U.S. Non-Provisional application Ser. No. 16/834,995 filed on Mar. 30, 2020, and titled Systems and Methods for Pause-Correct-Replay Workflow Customization, which in turn claims priority to U.S. Provisional Application No. 62/826,541, filed on Mar. 29, 2019, and titled Systems and Methods for Pause-Correct-Replay Workflow Customization, the contents all of which are incorporated by reference herein as though set forth in their entirety, and to which priority and benefit are claimed.

FIELD OF USE

The present disclosure relates generally to the field of customized workflow process technology. More specifically, the present disclosure relates to enhanced systems, methods, and processes for workflow technology that detects and pinpoints errors, pauses workflows, provides efficient corrective recourses, and replays workflows from varying vantage points.

BACKGROUND

Programmatic workflows are applications and systems that streamline and automate a wide variety of business processes. Workflow technology is enabling individuals and organizations across various industries to automate processes in a way that dramatically enhances productivity and efficiency. As a result, workflow technology is becoming more complex and is being integrated with other types of technology. Currently, a workflow process may, at a single point in time, be integrated to interact with various other workflows, receive input from multiple users, and depend on the occurrence of pre-determined events. A single workflow process may only be a small cog in a wheel within a large, complex system of moving parts for carrying out a business process, yet still play a vital role in the successful completion of the overall business process. Consequently, any errors within or disruptions to a single workflow may have a significant, negative impact on the overall process and/or its individual components.

Currently, users of existing programmatic workflow technology are limited in their ability to detect and correct errors within workflows. When errors are minute in size, detection can be even more difficult, time extensive, and costly. Even when an error is found, a workflow, and any actions already completed, may have to be restarted from the beginning as opposed to making only a small adjustment to the workflow and continuing from the point of error. Additionally, due to relationships with other processes and technology, errors in a single workflow can also impede and prevent other workflows or processes from being carried out on time or completely at all. Yet while an error may inhibit some workflows or processes from being carried out, others may continue unimpeded, relying on incomplete or incorrect data. This results in the potential for further errors within those workflows and additional costs, delays, and user frustration.

Thus, what is needed are systems and methods that allow users to specifically detect and correct errors quickly, efficiently, and with minimal repercussions. Once the error is corrected, users should have the option to continue the workflow from the point of failure or from a point prior to the point of failure, while also having the option to bypass completed actions and/or other actions in a workflow. The improved communication technology should also comprise functionality that pauses relevant workflows or processes as soon as the error is detected and while it is corrected. Such systems and methods should also improve communication technology between the networks and servers of separate parties relevant and/or dependent on successful execution of other workflows or processes; allowing for effective understanding, implementation, and engagement of business processes across organizational boundaries.

SUMMARY OF THE DISCLOSURE

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for pausing, correcting, and replaying workflow customizations that detect an erred action in a workflow, pause the erred workflow upon detection of the error; pause other workflows, processes, and instruments related to the execution of the erred workflow; provide the precise location of the error to the owner of the erred workflow; provide options to correct the detected error, the options comprising fixing and replaying from the point of the erred action or inserting new data and replaying the erred workflow from a point prior to the erred action; provide options to bypass certain actions in the erred workflow; and resume the erred workflow and other workflows, processes, and instruments previously paused because of the erred workflow. Such systems and methods may comprise communication technology between the networks and servers of separate parties relevant and/or dependent on successful execution of other processes; allowing for effective understanding, implementation, and engagement of business processes across organizational boundaries.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

DETAILED DESCRIPTION OF EMBODIMENTS

Before the present systems and methods are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
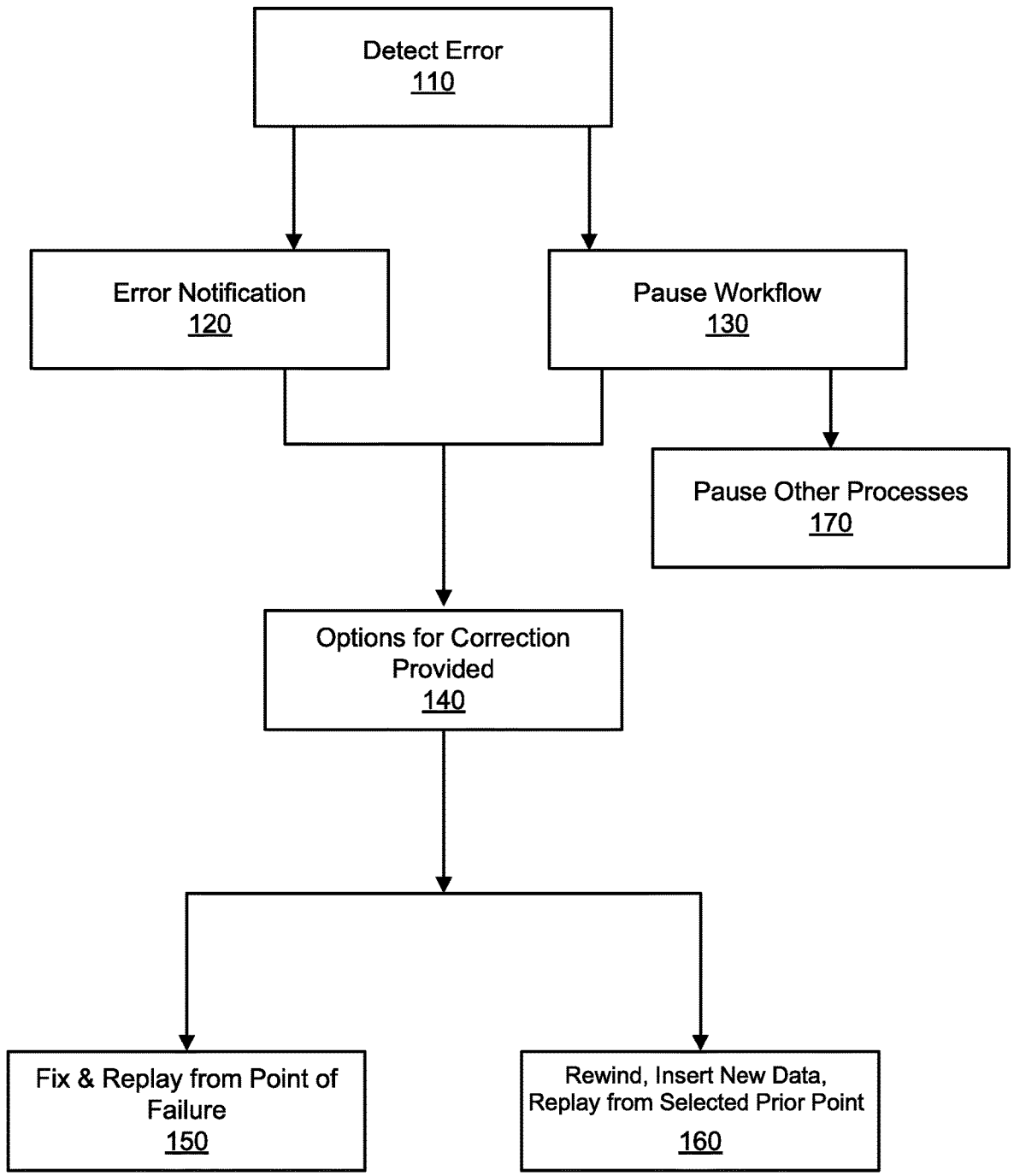
FIG. 1 is a functional flow diagram generally illustrating an embodiment of a pause-correct-replay workflow customization system.

FIG. 1 is a functional flow diagram generally illustrating an embodiment of a pause-correct-replay workflow customization system (the "customization system"). As shown in FIG. 1, the customization system may begin by detecting 110 an erred action within a workflow. Embodiments of the detected errors 110 comprise notification by a third party that an error has occurred, and the customization system detecting an error because a workflow is not able to process a step due to a parameter being wrong or missing. Upon detection 110 of the erred action, the customization system, at simultaneous times, may both notify 120 one or more users of the erred workflow that the erred action has occurred and pause 130 the erred workflow. The customization system may then provide the owner options for correction 140 of the erred action; the options for correction 140 comprising the option to pause, correct, and replay from the point of failure 150 or the option to pause, correct, and replay from a point prior 160 to the erred action of the workflow.

In one embodiment, once the customization system detects 110 an erred action and pauses 130 the erred workflow, the customization system may pause 170 other processes or workflows until the error is corrected. The pausing 170 of other processes may occur via the generated option, by the customization system, of manual pausing, or via automatic, pre-configured pausing. Manual pausing may comprise the customization system generating an option for a user to manually pause other processes upon the occurrence of the error notification 120 and/or the paused 130 workflow. Pre-configured pausing may comprise the customization system being configured to automatically pause other processes upon the occurrence of an event, the non-occurrence of an event, and the passage of a set amount of time. The pausing of other processes may occur immediately if pre-configured or may occur upon manual pausing. The timing of executing the request to pause 170 other processes, however, may depend on the load of the platform, as the pausing 170, whether automatic or manual, may need to be queued. Upon correction and replay of the erred action and its workflow, the customization system may resume all other paused processes and may also update all related processes to reflect the new data following correction.

Figure 2:
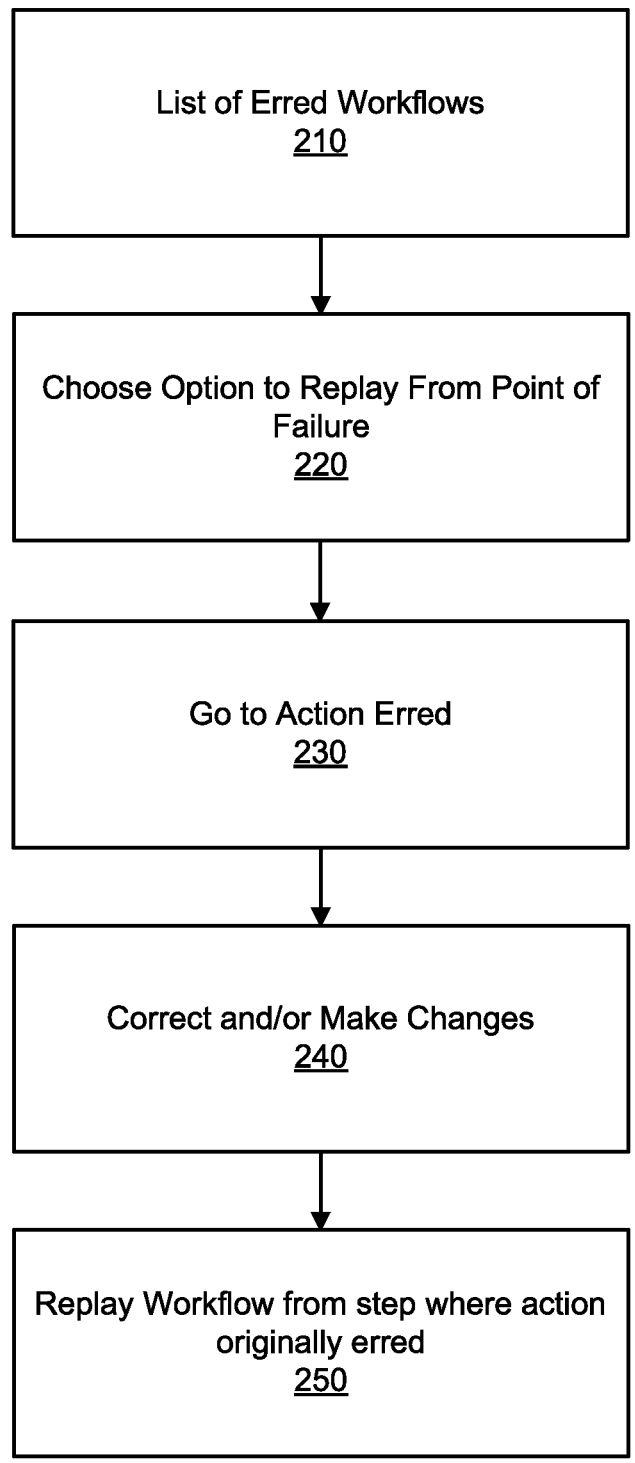
FIG. 2 is a functional flow diagram generally illustrating an embodiment of a pause-correct-replay workflow customization process for replaying from the point of the erred action.

FIG. 2 is a functional flow diagram generally illustrating an embodiment of a pause-correct-replay workflow customization process for replaying from the point of failure. Workflow customization for replaying from the point of failure 150 may begin with a customization system detecting 110 an erred action. Detection 110 of erred actions by the customization system generates a list 210 of erred workflows with specific details to a user of the erred workflows. Workflow customization by the customization system enables the user to select an erred workflow from the list 210 of erred workflows and display to the user: the precise location of the erred action within the erred workflow, the type of error, the timing of the error, the timing of when the workflow started, and the current status of the erred workflow. Along with the display of the details of the erred action and the erred workflow, the customization system may generate the option to replay the erred workflow from the point of failure 220. Upon selection of the option to replay from the point of failure 220, a user may go directly 230 to the erred action in the workflow, correct the error and/or make necessary changes 240, and replay 250 the workflow from the action where the error occurred.

The ability for a user to pause, correct, and replay from the point of failure allows for minor edits to be made to a workflow, as opposed to having to restart a workflow from the beginning. This has the benefit of not requiring the already completed actions (which most likely are correct) within the erred workflow to be run again. Similarly, other related, dependent, or corresponding actions, workflows, and processes that have already correctly run as a result of the workflow running may remain in place and are not required to run again. This has the benefit of preserving already completed work, already generated data, completed actions, and completed workflows. Additionally, it saves time and effort by not requiring already completed processes to be rewound, restarted, or replayed. If the corrective actions result in another error, a user may again pause, correct, and replay from the point of failure without having to continually replay from the beginning every time an error occurs.

Figure 3:
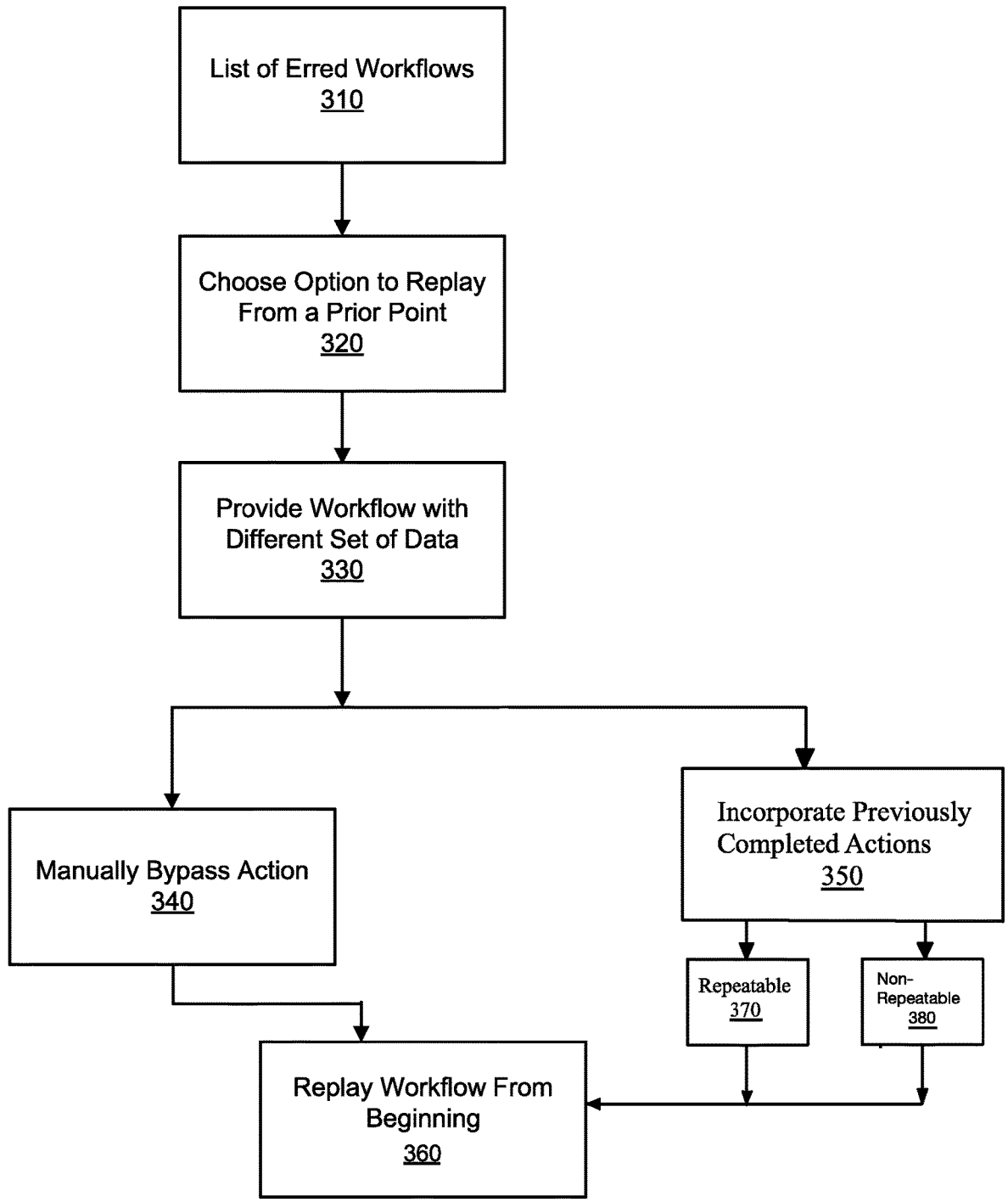
FIG. 3 is a functional flow diagram generally illustrating an embodiment of a pause-correct-replay workflow customization process for replaying from a point prior to the erred action.

FIG. 3 is a functional flow diagram generally illustrating an embodiment of a pause-correct-replay workflow customization process for replaying from a point prior to the erred action. A workflow customization for replaying from a point prior 160 to the erred action may begin with detection 110 of an erred action by the customization system. The customization system, upon detection 110 of an erred action, may generate and display a list 310 of erred workflows and their details to a user. The user selects the erred workflow from the list 310 of erred workflows and views: the precise location of the erred action within the workflow, the type of error, the timing of the error, the timing of when the workflow started, and the current status of the erred workflow. Along with the option to review the details of the erred action and the erred workflow, the customization system may generate the option to replay 320 from a point prior to the erred action, such as the beginning or the action immediately preceding the erred action. Upon selection of the option to replay 320 from a prior point, a user may select a prior point, go directly to the prior point, where the customization system may receive 330, from a user, a different set of data as input. The customization system may replay 360 the workflow from the selected prior point with the newly inserted data while manually bypassing 340 any completed actions, or, replay 360 the workflow from the prior point with the newly inserted data while also incorporating 350 and replaying the actions previously completed.

Thus, in one embodiment, the customization system may maintain the original data (whether it be input or output data) found in the workflow, generate an option to bypass completed actions, and generate an option to resume running the workflow with the completed actions bypassed.

In another embodiment, the customization system may generate an option to incorporate the actions previously completed and replay the workflow and the actions previously completed. Within the previously completed actions that are replayed, the customization system may distinguish between actions that can be repeated 370 and those actions that cannot be repeated 380. Non-repeatable actions 380 may not be completed again and require the customization system to keep the corresponding input/output data for when the workflow is replayed. For example, if an action causes a file to be moved, that action may not be able to be repeated. Yet when the workflow replays, the customization system can still use the input/output data from that action as if the action was replayed, without requiring the file to be moved again. Repeatable actions 370 can be replayed, incorporating the data from the replayed action into the workflow. In replaying from a point prior to the point of failure and incorporating actions previously completed, whether repeatable 370 or non-repeatable 380, the customization system may receive data that can be inputted into the point prior to the erred action with the aim that it be executed correctly.

In one embodiment, upon detection 110 of an erred action, the customization system may be sufficiently intelligent so as to prevent future occurrences of the detected error. The customization system may accomplish this by collecting and analyzing workflow data over time such that it can detect workflow execution patterns and how user input affects the detected patterns. The prevention of errors may be accomplished by the customization system receiving a user's input, comparing it to existing relevant data previously analyzed, and generating error notifications 120, such as notification prompts visible to the user. Notification prompts may comprise a warning to the user that the inputted values are irregular, have never been used before, or are out of regular thresholds.

Customization system intelligence may also comprise detection of other related workflows being affected by a potential error. When the customization system detects related workflows being potentially affected, the customization system may pause the related workflows at any point up to the step where they would be affected. Upon correction of the error, the related workflows may resume running. Alternatively, in line with the erred workflow being replayed, the related workflows may also be replayed from a prior point in time with the option to bypass completed actions or replay the actions previously completed, incorporating the same logic that non-repeatable actions cannot be repeated and requiring the customization system to maintain the input/output data.

The customization system may also comprise auditing capabilities that ensure replays are tracked and relationally linked to relevant and corresponding actions and workflows. The customization system may track data such as how the workflow was replayed and the relationship between the replayed action and the erred action, the erred workflow, and other workflows. The customization system may keep copies of erred workflows and their erred actions and track the relational effects of those errors.

Figure 4:
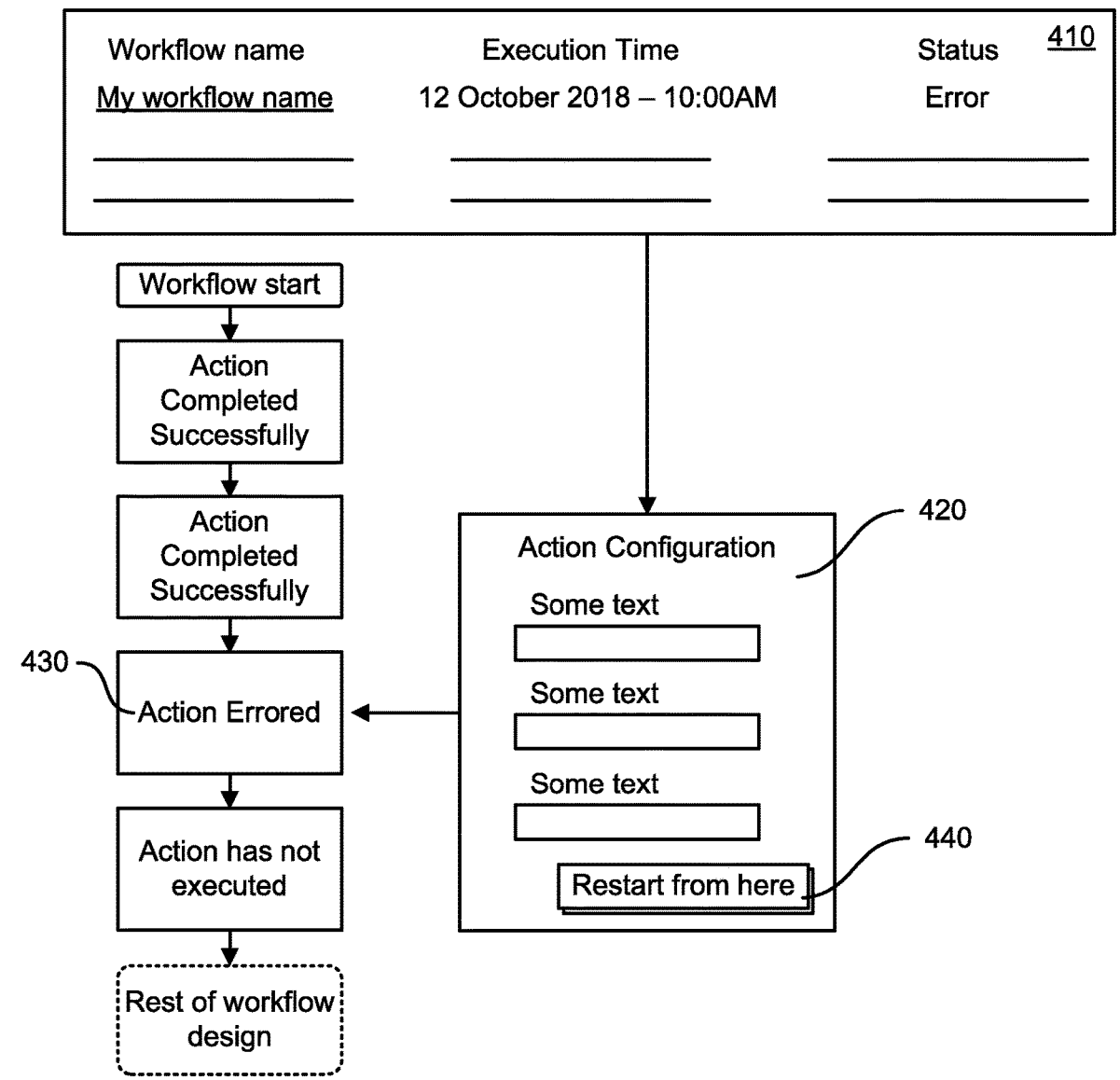
FIG. 4 is a functional flow diagram generally illustrating an embodiment of a pause-correct-replay workflow customization process for replaying from the point of the erred action.

FIG. 4 is a functional block diagram generally illustrating an embodiment of a pause-correct-replay workflow customization process for replaying from the point of failure. The customization system may connect to one or more workflows, wherein the one or more workflows may transmit their status to the customization system. As shown in FIG. 4, the customization system may generate and display a list 410 of all workflow processes and their details. Details of the displayed workflow processes 410 may include the names of workflows, their execution time, and status (such as completed, erred, pending). The customization system may provide a user with the ability to select a workflow with an erred status. Upon selection of the erred workflow, the customization system may provide the user with the option to replay the erred workflow from the point of failure. Upon the user selecting the option to replay from point of failure, the customization system may display an action configuration option 420. The action configuration option 420 corresponds with the erred action 430 in the erred workflow. The action configuration option 420 displays the error(s) that make up the erred action and generates corrective recourses that a user may select. The action configuration option 420 may also receive from the user inputted data that serves as corrective recourse input. Upon receiving corrective recourse input, the action configuration option 420 generates a restart from point of failure selection 440. Upon a user selecting the restart from point of failure selection 440, the customization system may transmit the received corrective recourse input to the erred workflow and cause the erred workflow to replay—meaning, to resume functioning as a workflow process—with the corrective recourse now in place at the erred action. Upon selection of the restart from point of failure selection 440, the customization system may also resume all other workflows or processes that were paused pending resolution of the erred workflow.

Figure 5:
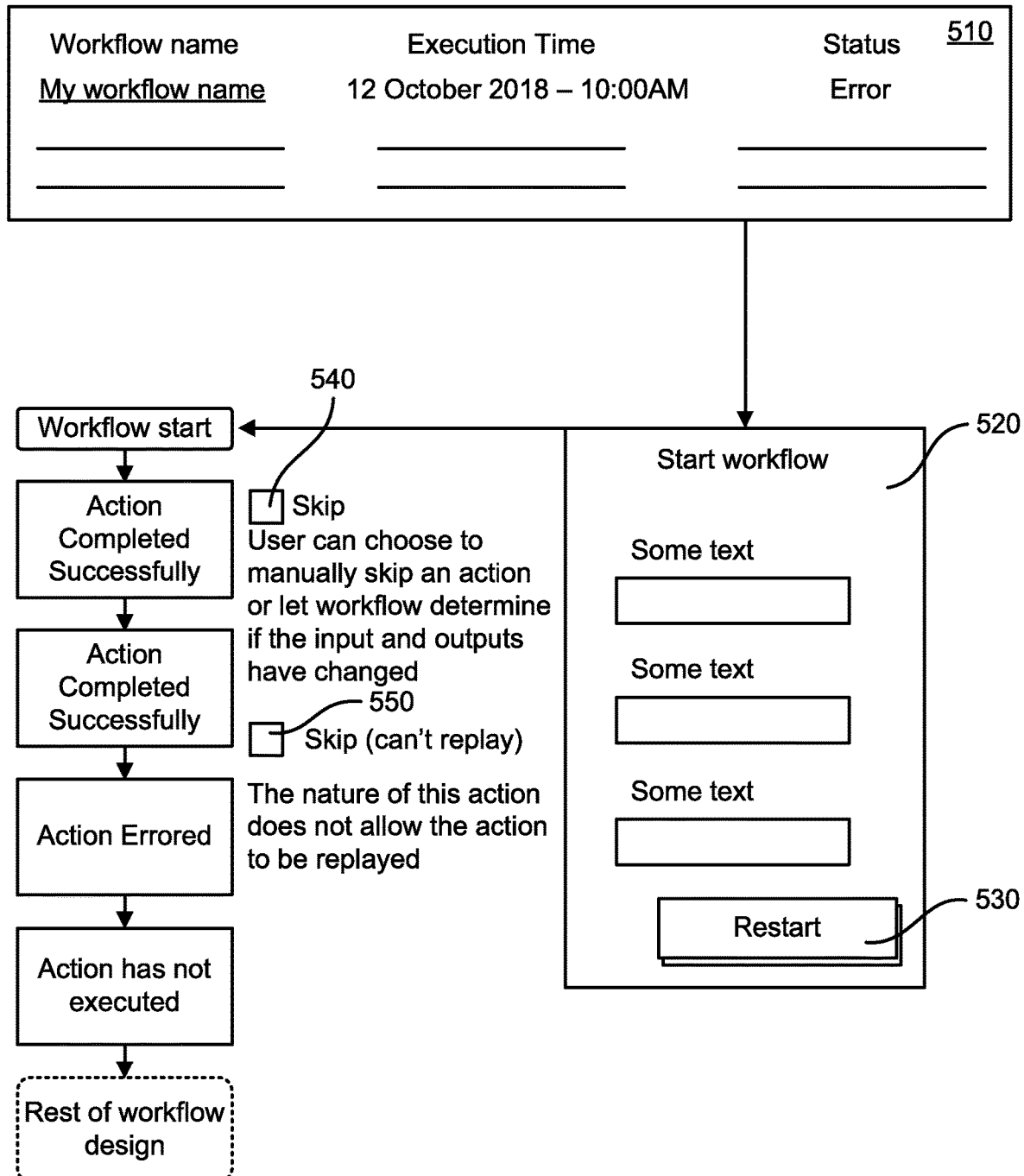
FIG. 5 is a functional flow diagram generally illustrating an embodiment of a pause-correct-replay workflow customization process for replaying from a point prior to the erred action.

FIG. 5 is a functional block diagram generally illustrating an embodiment of a pause-correct-replay workflow customization process for replaying from a point prior to the erred action. The customization system may connect to one or more workflow processes, wherein the one or more workflow processes may transmit their status to the customization system. As shown in FIG. 5, the customization system may generate a list 510 of all workflows. The list of workflows 510 may include the names of workflows, their execution time, and status (such as completed, erred, pending). The customization system may provide a user with the ability to select a workflow with an erred status. Upon selection of the erred workflow, the customization system server may provide the user with the option to replay the erred workflow from a point prior to the erred action. Upon the user selecting the option to replay from a prior point, the customization system may display an action configuration option 520. The action configuration option 520 corresponds with the erred workflow, its erred action, and the points prior to the point of the erred action. The action configuration option 520 displays the points prior to the point of the erred action and provides the user both with the ability to select a prior point for correction and corrective recourses. The action configuration option 520 may also enable the user to update data. Upon selection of a prior point and receiving corrective recourse, the action configuration option 520 generates a restart selection 530. Upon a user selecting the restart selection 530, the customization system may transmit the received corrective recourse to the erred workflow, configure the corrections in accordance with complete and incomplete actions (and their data) in the erred workflow, determine the corrections' impact within the erred workflow when compared to the complete/incomplete actions, and do one or more of the following: (1) generate an option to replay and manually skip 540 completed actions, (2) generate an option to replay and run the workflow with the new input, and (3) generate an option to replay and run the workflow with the new input with one or more notifications that certain actions within the workflow cannot be replayed 550 (cannot be repeated). Upon generation of notification that certain actions cannot be replayed 550, the customization system may mark up a workflow's actions to distinguish which actions are repeatable and which are not repeatable. For repeatable actions, the customization system may further generate options of bypassing or repeating again.

Although other completed actions may be replayed, such as retrieving information, it may be more beneficial or preferred to bypass the completed actions; hence the option to bypass. Upon selection of either the option to replay and manually bypass 540 the completed actions or the option to replay and run the workflow with the new input, the customization system may initiate the erred workflow to replay—to resume functioning as a workflow process from the beginning of the workflow—with the corrective recourse input. Upon selection of the replay selection 530, the customization system may also resume all other workflows or processes that had been paused pending resolution of the erred workflow.

Figure 6:
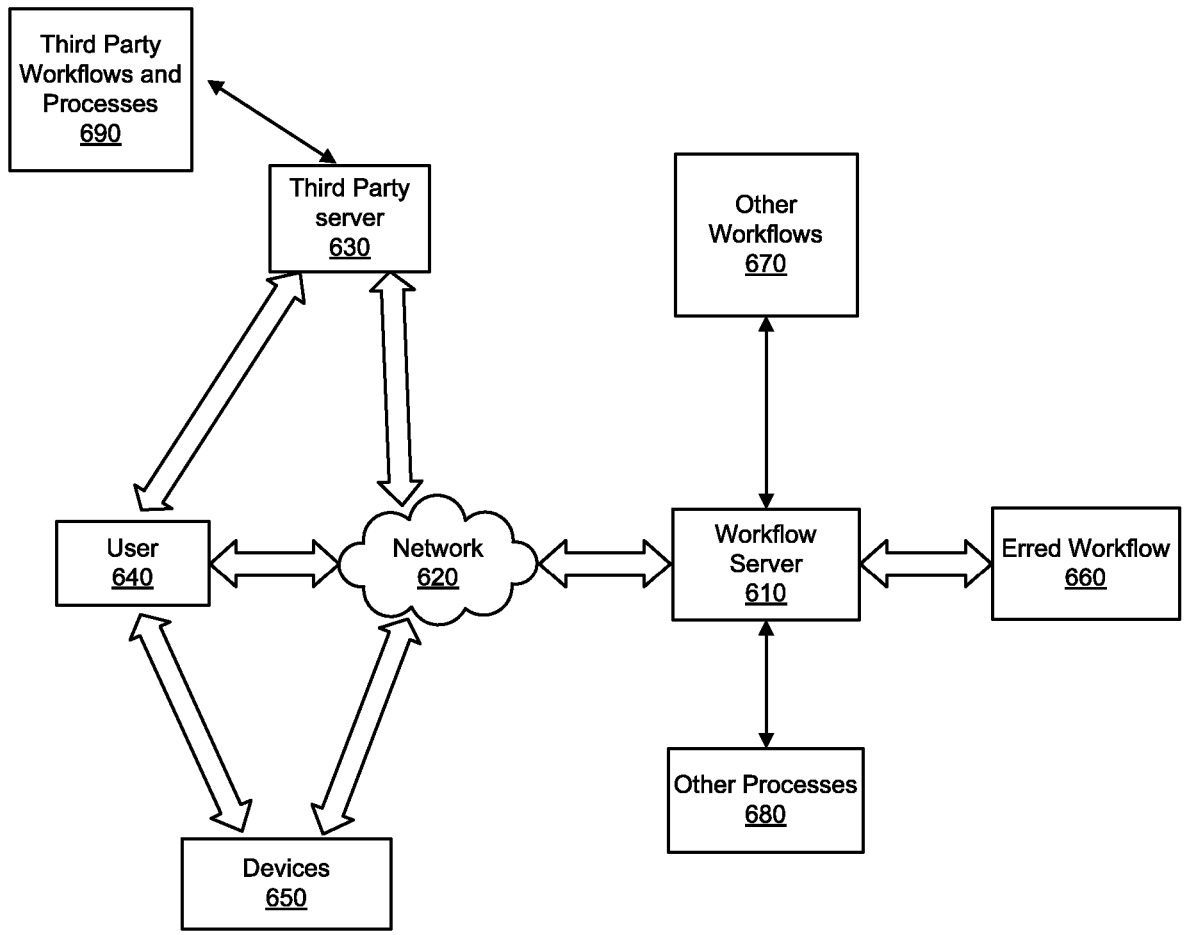
FIG. 6 is a functional block diagram generally illustrating an embodiment of a network system for a pause-correct-replay workflow customization system.

FIG. 6 is a functional block diagram generally illustrating an embodiment of a network system for a pause-correct-replay workflow customization system. A network system, as shown in FIG. 6, may comprise a workflow server 610 accessible over a local area network or a wide area network 620, such as the Internet. The customization design may reside within the workflow server 610, or within other servers, electronic devices 650, or third-party servers 630. The workflow server 610 may enable third party servers 630, users 640, and electronic devices 650 to connect to an erred workflow 660. The workflow server 610 may also host additional workflows 670 that are accessible to their respective owners and other users.

In accordance with the preferred embodiment, the customization system is remotely accessible by a number of user-computing devices 650 including, for example, laptops, smartphones, computers, tablets, and other computing devices that are able to access the local area network or a wide area network where the customization system resides. In normal operation, each user electronic device 650 connects with the customization system to interact with the erred workflow 660 and the additional workflows 670 and processes 680. As is also known, each additional workflow 670 or process 680 may employ a number of connectors to interact with third-party servers 630 and their data, services, or applications, such as a third-party workflow or process 690.

Figure 7:
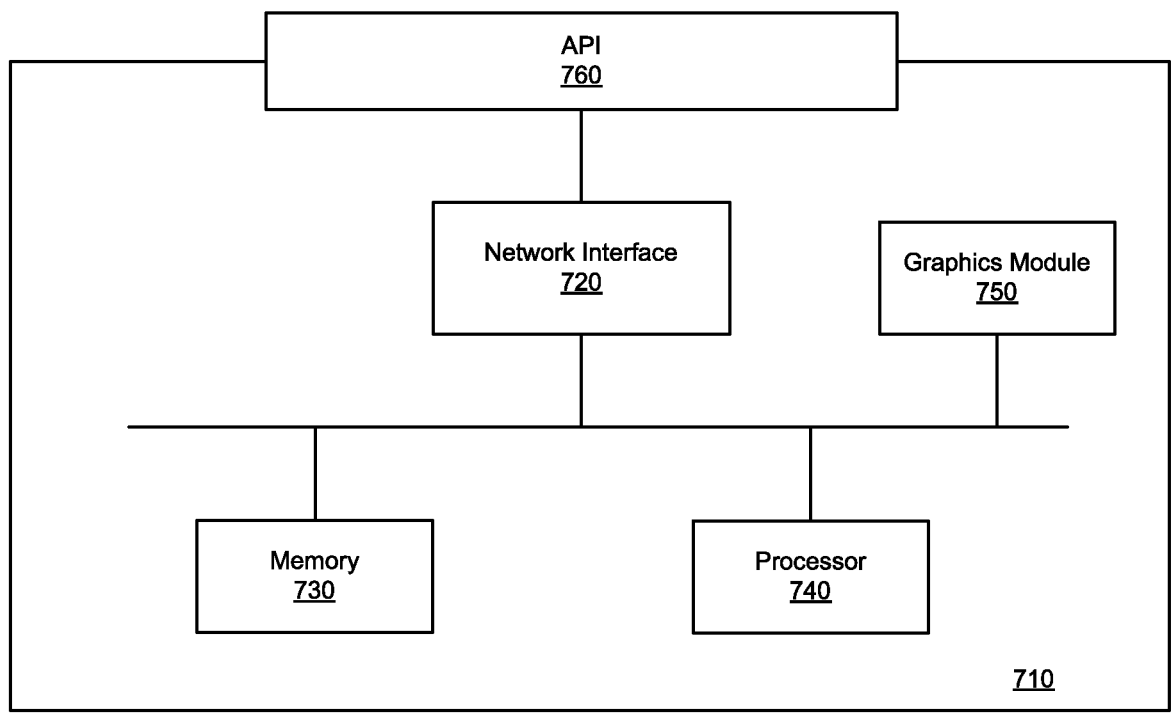
FIG. 7 is a functional block diagram generally illustrating an embodiment of an electronic device system for a pause-correct-replay workflow customization system.

FIG. 7 is a functional block diagram generally illustrating an embodiment of an electronic device system for a pause-correct-replay workflow customization system. The electronic device 710 may be coupled to a workflow server 610 via a network interface 720. The electronic device 710 generally comprises a memory 730, a processor 740, a graphics module 750, and an application programming interface 760. The electronic device 710 is not limited to any particular configuration or system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses, and computer program products. It will be understood that each block of the block diagrams, schematic diagrams, flowchart illustrations, and combinations of blocks in the block diagrams, schematic diagrams, and flowchart illustrations, respectively, may be implemented by computer program instructions. These computer program instructions may be loaded onto a general-purpose computer, special-purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

These and other features, and characteristics of the present technology, as well as the methods of operation and functions of the related elements of structure and the combination of parts and economies of manufacture, will become more apparent upon consideration of the description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

In addition, the various illustrative logical blocks, modules, and circuits described in connection with certain embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order; it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A system for correcting workflow errors, comprising:
   a computer system having a hardware processor and a physical memory using executable instructions that, as a result of being executed by the hardware processor, cause the computer system to:
   identify, by the hardware processor, an erred action associated with a programmatic workflow process;
   generate, by the hardware processor, and based at least in part on the identifying, a set of corrective options for the erred action, wherein the set of corrective options comprise at least one of: an option to correct the programmatic workflow process from a point of the erred action, an option to correct the programmatic workflow process from a point prior to the point of the erred action, or combinations thereof; and
   display, by the hardware processor, based at least in part on the generating, the set of corrective options.

2. The system of claim 1, wherein the executable instructions further comprise instructions that, as a result of being executed by the hardware processor, cause the computer system to:
   generate, by the hardware processor, a notification of the erred action; and
   display, by the hardware processor, based at least in part on the generating the notification, the notification of the erred action.

3. The system of claim 1, wherein the executable instructions further comprise instructions that, as a result of being executed by the hardware processor, cause the computer system to:
   detect, by the hardware processor, the erred action; and
   pause, by the hardware processor, based at least in part on the detecting, the programmatic workflow process.

4. The system of claim 1, wherein the executable instructions further comprise instructions that, as a result of being executed by the hardware processor, cause the computer system to:
   generate, by the hardware processor, update functions for correcting the erred action, wherein the update functions comprise at least one of: input data into the erred action, remove data from the erred action, or combinations thereof.

5. The system of claim 1, wherein the executable instructions further comprise instructions that, as a result of being executed by the hardware processor, cause the computer system to:
   display, by the hardware processor, a location and data of the erred action.

6. The system of claim 5, wherein the executable instructions further comprise instructions that, as a result of being executed by the hardware processor, cause the computer system to:
   identify, by the hardware processor, a selection of the option to correct the programmatic workflow process from the point of the erred action, wherein the displaying the location and data of the erred action is based at least in part on the identifying.

7. The system of claim 1, wherein the executable instructions further comprise instructions that, as a result of being executed by the hardware processor, cause the computer system to:
identify, by the hardware processor, a selection of the option to correct the programmatic workflow process from the point of the erred action; and
determine, by the hardware processor, based at least in part on the identifying, one or more separate workflows interrelated to the workflow.

8. The system of claim 7, wherein the executable instructions further comprise instructions that, as a result of being executed by the hardware processor, cause the computer system to:
generate, by the hardware processor, based at least in part on the determining the one or more separate interrelated workflows, an option to pause the interrelated one or more separate workflows.

9. The system of claim 7, wherein the executable instructions further comprise instructions that, as a result of being executed by the hardware processor, cause the computer system to:
pause, by the hardware processor, based at least in part on the determining the one or more separate interrelated workflows, at least one of the interrelated one or more separate workflows.

10. The system of claim 1, wherein the executable instructions further comprise instructions that, as a result of being executed by the hardware processor, cause the computer system to:
generate, by the hardware processor, an option to replay the programmatic workflow process from the point of the erred action.

11. The system of claim 1, wherein the executable instructions further comprise instructions that, as a result of being executed by the hardware processor, cause the computer system to:
identify, by the hardware processor, a selection of the option to correct the programmatic workflow process from the point prior to the point of the erred action; and
display, by the hardware processor, based at least in part on the identifying the selection, a location and data of the erred action.

12. The system of claim 1, wherein the executable instructions further comprise instructions that, as a result of being executed by the hardware processor, cause the computer system to:
identify, by the hardware processor, a selection of the option to correct the programmatic workflow process from the point prior to the point of the erred action; and
generate, by the hardware processor, based at least in part on the identifying the selection, selective capabilities for selecting a point prior to the erred action.

13. The system of claim 12, wherein the executable instructions further comprise instructions that, as a result of being executed by the hardware processor, cause the computer system to:
generate, by the hardware processor, update functions for correcting a selected point, wherein the update functions comprise at least one of: input data into the selected point, remove data from the selected point, or combinations thereof.

14. The system of claim 13, wherein the executable instructions further comprise instructions that, as a result of being executed by the hardware processor, cause the computer system to:
display, by the hardware processor, the update functions.

15. The system of claim 13, wherein the executable instructions further comprise instructions that, as a result of being executed by the hardware processor, cause the computer system to:
generate, by the hardware processor, an option to replay the workflow from the selected point; and
display, by the hardware processor, based at least in part on the generating the option to replay, the option to replay the workflow from the selected point.

16. A method for correcting workflow errors, comprising:
identifying an erred action associated with a programmatic workflow process;
generating, and based at least in part on the identifying, a set of corrective options for the erred action, wherein the set of corrective options comprise at least one of: an option to correct the programmatic workflow process from a point of the erred action, an option to correct the programmatic workflow process from a point prior to the point of the erred action, or combinations thereof; and
displaying, based at least in part on the generating, the set of corrective options.

17. The method of claim 16, further comprising:
generating a notification of the erred action; and
displaying, based at least in part on the generating the notification, the notification of the erred action.

18. The method of claim 16, further comprising:
detecting the erred action; and
pausing, based at least in part on the detecting, the programmatic workflow process.

19. The method of claim 16, further comprising:
generating update functions for correcting the erred action, wherein the update functions comprise at least one of: input data into the erred action, remove data from the erred action, or combinations thereof.

20. The method of claim 16, further comprising:
displaying a location and data of the erred action.

* * * * *